RE 25743

Aug. 4, 1959 D. RICHMAN 2,898,458

PHASE DETECTOR

Filed April 12, 1955

United States Patent Office 2,898,458

Patented Aug. 4, 1959

2,898,458

PHASE DETECTOR

Donald Richman, Fresh Meadows, N.Y., assignor to Hazeltine Research, Inc., Chicago, Ill., a corporation of Illinois Application April 12, 1955, Serial No. 500,792

8 Claims. (Cl. 250—27)

This invention relates to phase detectors for television receivers and, particularly, to such phase detectors for the line-deflection system in such receivers and, therefore, will be described in that environment.

In order to obtain a satisfactory image on the screen of a television picture tube, accurate synchronization should be maintained at all times, and under the most extreme signal conditions, between the scanning process at the receiver and the synchronizing components of the received television signals. To accomplish such a result, at one time the line-scanning systems of television receivers were constructed so that each line-synchronizing pulse was applied directly to a line-frequency oscillator for generating scanning waves, thereby causing each pulse to initiate or trigger one cycle of oscillation of the scanning wave. Such systems are conventionally designated as "triggered type sychronizing systems" and operate satisfactorily if the signal-to-noise ratio is high and there is little tendency for noise signals to cause triggering of the scanning wave. However, in practice, noise disturbances and other unwanted signals are usually present and, in a triggered type synchronizing system, tend to trigger the oscillator, thereby tending to destroy synchronization and distort the reproduced image.

To overcome the deleterious effects of such noise disturbances, more recently line-scanning systems have been constructed to have some immunity from such disturbances. Generally, such systems include circuits for integrating a number of line-synchronizing pulses to provide an averaged control effect for the scanning system rather than directly utilizing such synchronizing pulses to control the system. One type of such system has, for example, taken the form of a phase detector, a suitable low-pass filter network in the form of an integration circuit, and a direct-current amplifier sometimes designated as a reactance control device, arranged to supply its output potential to a line-frequency oscillator. Line-synchronizing pulses from a received television signal and an output signal of the line-frequency oscillator are applied to the phase detector and variations in the output potential of the phase detector, caused by phase changes between the synchronizing pulses and the signal generated in the line-frequency oscillator as supplied to the detector, impress a varying amplitude control potential on the direct-current amplifier. The latter potential is of relatively low frequency with respect to the repetition rate of the line-synchronizing pulses due to the low-frequency response characteristic of the integration circuit and, therefore, such a system may be said to have a low-frequency response characteristic. In effect, in the latter synchronizing system, random noise pulses or other undesired signals are averaged out over a substantial number of cycles while the coherent information in the line-synchronizing pulses is averaged to effect the desired control. This type of synchronizing system is conventionally known as an automatic-frequency-control (AFC) system though more accurately it is an automatic-phase-control (APC) system and will be referred to as such hereinafter. Though such APC systems are more immune to noise and other undesired signals than the triggered systems, they fall short of being entirely immune. The present invention is directed to an improved phase detector for use in line-frequency APC systems which provide such systems with a degree of noise immunity previously not attained.

It is an object of the present invention, therefore, to provide a new and improved phase detector for the beam-deflection system of a television receiver which does not have the above-mentioned limitations and deficiencies of prior phase-detector systems.

It is a further object of the present invention to provide a new and improved phase detector for the beam-deflection system of a television receiver which causes such system to have a higher degree of noise immunity than attained in prior systems.

It is an additional object of the present invention to provide a new and improved palanced phase detector for use in the beam-deflection system of a television receiver and having a single electron stream.

Before considering the present invention in detail, reference is hereby made to applicant's copending application Serial No. 500,904, filed the same date as the present application, and entitled "Phase Detector." This copending application covers a novel feature shown in the drawing of the present application and which may be utilized together with the present invention to obtain further improvements in circuit operation.

It is also an object of the present invention to provide a new and improved phase detector for the beam-deflection system of a television receiver which is simple and inexpensive in construction.

In accordance with the present invention, a phase detector for the beam-deflection system of a television receiver comprises one circuit for supplying beam-deflection synchronizing pulses and another circuit for supplying locally generated deflection signals which tend to vary in phase with respect to the synchronizing pulses. The phase detector also comprises an electron-discharge device including a plurality of output electrodes coupled to the aforesaid other supply circuit and a plurality of control electrodes one of which is responsive to the synchronizing pulses for controlling the current flowing to one of the output electrodes. In addition, the phase detector includes means including a signal-shaping circuit coupled between the one supply circuit and another of the control electrodes for modifying the shape of the synchronizing pulses and for applying the modified pulses to the other control electrode for controlling the current flowing to another of the output electrodes. The phase detector also includes means including a load circuit coupled to the aforementioned output electrodes for developing a phase-control potential in accordance with the ratio of the average currents flowing therethrough.

For a better understanding of the present invention, together with other and further objects thereof, reference is had to the following description taken in connection with the accompanying drawing, and its scope will be pointed out in the appended claims.

Referring to the drawing.

As used herein, the term "electron-discharge device" is intended to describe an electrical-signal-responsive or magnetic-signal-responsive device having an asymmetrical or controllable conductivity characteristic. Among the most commonly known electron-discharge devices are, for example, electron-discharge tubes, transistors, and fieldistors.

Figure 1:
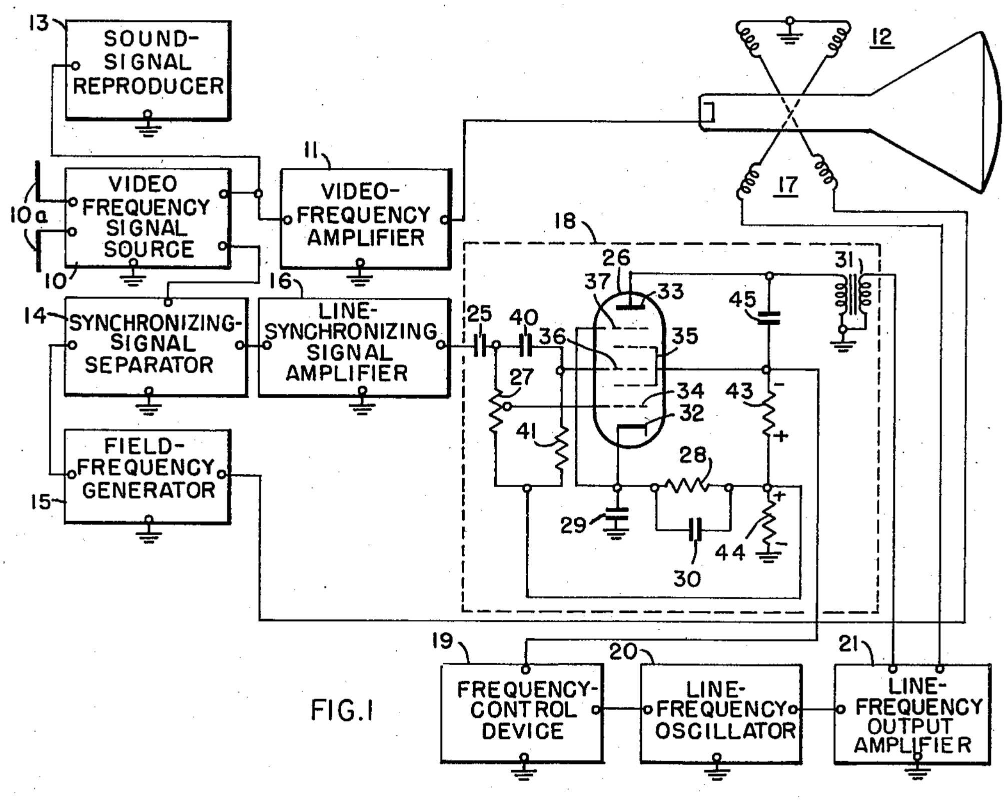
Fig. 1 is a schematic diagram of a television receiver including a phase detector for the beam-deflection system therein in accordance with the present invention.

*General description and operation of television receiver of Fig. 1*

Referring now to Fig. 1, the television receiver illustrated therein comprises a video-frequency signal source 10 which may include a radio-frequency amplifier, a first detector, an intermediate-frequency amplifier, and a second detector, all such components being of conventional construction and being cascade connected in the well-known manner to form a video-translating portion of a television receiver. If a radio-frequency amplifier is included, the input circuit thereof is coupled to an antenna system 10*a*. One output circuit of the source 10 is coupled through a conventional video-frequency amplifier 11 to an intensity control electrode, for example, the cathode of a cathode-ray image-reproducing apparatus 12 for controlling the intensity of the electron beam developed therein. The same output circuit of the source 10 may also be coupled to a sound-signal reproducer 13 which may include a sound-signal intermediate-frequency amplifier, a detector, an audio-signal amplifier, and a sound-reproducing device, all connected in cascade in the well-known manner to provide the sound translating portion of a television receiver.

An output circuit of the source 10 is connected through a synchronizing-signal separator 14 to a field-frequency generator 15 and a line-synchronizing signal amplifier 16. The output circuit of the field-frequency generator 15 is connected to the vertical deflection winding of the pair of deflection windings 17 while the output circuit of the amplifier 16 is coupled in cascade in the order named through a phase detector 18, in accordance with the present invention and to be described more fully hereinafter, a frequency-control device 19, a line-frequency oscillator 20, and a line-frequency output amplifier 21 to the horizontal deflection winding of the pair of windings 17. The horizontal deflection winding is also coupled to an input circuit of the phase detector 18.

Of the units thus far described, all thereof except the phase detector 18, in accordance with the present invention and to be described more fully hereinafter, may be of a conventional design and construction well known in the art and further detailed description thereof will not be given.

Considering now the operation of the television receiver of Fig. 1 generally, it will be assumed that the phase detector 18 is a conventional phase detector. If the source 10 includes a radio-frequency amplifier, first detector, intermediate-frequency amplifier, and second detector, the radio-frequency amplifier and first detector may be tuned to amplify and heterodyne to an intermediate frequency a television signal intercepted by the antenna system 10*a*. The intermediate-frequency signal is then further amplified in the intermedate-frequency amplifier and the video-frequency components thereof are detected by the second detector. Such video-frequency components include picture signals, synchronizing signals, and sound signals. The picture signals are further amplified by the video-frequency amplifier 11 and applied to the cathode of the image-reproducing apparatus 12 to control the intensity of the electron beam therein in the well-known manner. The sound signal is applied to the reproducer 13 wherein it is further amplified, the audio-frequency components thereof derived, and the derived components further amplified and employed to reproduce sound in a conventional manner.

The synchronizing signals are applied to the synchronizing-signal separator 14 wherein the line-synchronizing and field-synchronizing components are separated from the picture and sound signals and from each other and applied, respectively, to the amplifier 16 and the generator 15. The field-synchronizing signals are employed in the generator 15 to synchronize the operation of such generator with a corresponding generator at the transmitter and the signals developed in such generator are applied to the vertical deflection winding of the windings 17 to effect vertical deflection of the electron beam in the apparatus 12 in the well-known manner. The line-synchronizing components are amplified in the unit 16 and employed in the phase detector 18 in combination with a line-deflection signal, which is developed in the oscillator 20 and translated through the amplifier 21, to develop a synchronizing control signal representative of any phase variation of the signal developed in the oscillator 20 with respect to the line-synchronizing signal. The synchronizing control signal is applied through the frequency-control device 19 to the line-frequency oscillator 20 to control the phase of the signal developed in such oscillator. The signal developed in the oscillator 20 is amplified in the unit 21 and applied to the line-deflection winding of the windings 17 to effect horizontal deflection of the electron beam developed in the apparatus 12 in the well-known manner. The line deflection and field deflection of the electron beam, effected by means of the windings 17, together with the intensity modulation of such beam, by means of the signal translated through amplifier 11, result in the reproduction of the televised image in the apparatus 12. Except for the operation of the phase detector 18, the receiver of Fig. 1 operates in a conventional manner.

*Description of phase detector of Fig. 1*

The phase detector 18 of Fig. 1 is part of the beam-deflection system of the television receiver of Fig. 1, specifically, it is the phase detector in the APC system of the line-deflection circuits of such receiver. The phase detector includes one circuit for supplying beam-deflection synchronizing pulses, specifically, the input circuit coupled to the amplifier 16 for supplying positive-going line-frequency synchronizing pulses. Such input circuit comprises a coupling condenser 25 and a tapped resistor 27 connected between the output circuit of the amplifier 16 and a first control electrode 34 of a multielectrode tube 26. The resistor 27 is a combination signal load resistor and biasing resistor and is coupled in series with a cathode resistor 28. The control electrode 34 is connected to an intermediate point on the resistor 27 to equate the magnitudes of the signal applied to the electrode 34 with that applied to another control electrode 36, to be discussed more fully hereinafter. The cathode and the junction of the resistors 27 and 28 are by-passed to a reference potential, such as ground, for all signals having frequencies higher than a few kilocycles by means of condensers 29 and 30, respectively. The condensers 29 and 30 cooperate with the resistors 28, 43, and 44 to provide means for averaging the currents flowing through such resistors to develop unidirectional potentials across such resistors.

The phase detector 18 also includes another circuit for supplying locally generated deflection signals tending to vary in phase with respect to the synchronizing pulses, specifically, a transformer 31 having the primary thereof coupled to the output circuit of the line-frequency output amplifier 21 and the secondary thereof coupled directly to the anode of the tube 26 and through a condenser 45 to the screen electrode 35 for applying positive-going line-frequency flyback pulses to these electrodes. Such line-frequency flyback pulses represent the phase of the signal developed in the oscillator 20 and tend to vary in phase with respect to the synchronizing pulses applied to the first control electrode through the condenser 25.

The phase detector 18 also includes an electron-discharge device, specifically, the vacuum tube 26 having different gains for different conditions of synchronization of the line-synchronizing system, and having means for developing a stream of current carriers and for directing such stream along a path, and including a plurality of output and control electrodes in such path. The output electrodes are coupled to the circuit for supplying the locally generated signals and the control electrodes are coupled to the circuit for supplying the synchronizing signals for controlling the current flowing to the output electrodes. More specifically, the tube 26 includes a cathode 32 for developing a stream of electrons in a conventional manner and for directing such stream along the conventional electron path toward the anode 33 of the tube 26. In addition to the cathode 32 and the anode 33, the tube 26 includes the first control electrode 34, the screen electrode 35, a second control electrode 36, and a suppressor electrode 37, the latter electrode being directly coupled to the cathode. It will be noted that the connection and operation of the screen electrode 35 are such that this electrode constitutes another signal anode. The bias potentials on the control electrodes 34 and 36 control the gain of the tube 26 and are such, as will be explained more fully hereinafter, as to cause the device 26 to have minimum gain when the line-frequency oscillator 20 is synchronized and maximum gain when it is out of synchronism. In addition, the biasing potentials on the cathode 32 and control electrodes 34 and 36 are such, with respect to the potentials on the anode and screen electrode, as to cause the tube 26 to be nonconductive except when line-synchronizing pulses and flyback pulses are applied in coincidence, respectively, to the control electrode 34 and to the anode and screen electrode. Coincidence of these pulses will result in screen current. To cause anode current to flow, a positive differentiated synchronizing pulse must be applied to the control electrode 36 in coincidence with the pulses applied to the electrode 34, screen electrode 35, and anode 33. As previously described, the first control electrode 34 is coupled to the supply circuit for supplying the positive-going line-frequency synchronizing pulses while the anode 33 is coupled to the supply circuit for supplying positive-going flyback pulses.

The phase detector may also include a signal-shaping circuit, specifically, a signal-differentiating circuit coupled between the circuit for supplying the line-frequency synchronizing pulses and the control electrode 36 for modifying the shape of the synchronizing pulses and for applying the modified pulses to the electrode 36 for controlling the current flowing to the anode 33. More specifically, the signal-shaping circuit comprises a condenser 40 and resistor 41 coupled between the junction of the condenser 25 and the resistor 27 and the control electrode 36 for differentiating the synchronizing pulses and for applying the differentiated pulses to the latter electrode.

In addition, the phase detector 18 includes a load circuit coupled between the cathode and the output electrodes and responsive to the stream of current carriers for developing, at the screen electrode 35, a phase-control potential in accordance with the ratio of the average currents flowing in the anode and screen-electrode circuits and representative of any phase difference of the synchronizing pulses and the locally generated signals. In addition, the load circuit may include an impedance which is coupled between the cathode 32 and the control electrodes 34 and 36 for developing a potential which may be employed as a gain-control potential for the pair of control electrodes 34 and 36. The gain-control potential is developed in accordance with the magnitudes of the average current flowing in the cathode circuit. More specifically, such circuit means includes a pair of series-connected resistors 43 and 44 connected between the screen electrode 35 and the anode 33 through the secondary winding of the transformer 31. The junction of the resistors 43 and 44 is connected to the terminal of the resistor 28 remote from the cathode and across this resistor 28 the biasing potential for the electrodes 34 and 36 is developed. The resistors 43 and 28 provide a screen electrode-to-cathode resistive path while the resistors 44 and 28 and the secondary winding of the transformer 31 provide an anode-cathode resistor path. For reasons to be considered more fully hereinafter, the resistors 43 and 44 preferably have values in inverse ratio of the average screen current to the average anode current for a specific phase relation of the line-synchronizing pulses and the flyback pulses to provide a balanced signal output characteristic for the phase detector.

If such gain-control potential is employed to control the gain of the tube 26, the phase detector 18 also includes means for applying the gain-control potential between the cathode and the control electrodes to vary the gain of the detector 18 in accordance with the phase relation of the locally generated signals and synchronizing pulses. More specifically, such means comprises the cathode load resistor 28 and the coupling of the junction of the resistors 43 and 44 through the grid-biasing resistors 27 and 41, respectively, to the control electrodes 34 and 36. The development and utilization of such gain-control potential are novel features which are covered by the mentioned copending application.

*Explanation of operation of phase detector of Fig. 1*

The phase detector 18 of Fig. 1 develops a relatively noise-free signal representative of the phase relation of the applied line-synchronizing and flyback pulses for controlling the phase of the signal developed in the oscillator 20. In addition, the phase detector 18 may be employed to develop a bias potential for application to the first and second control electrodes 34 and 36 to cause the tube 26 to have high gain when the system is not in synchronism and relatively low gain when the system is in synchronism. The high-gain condition, when the system is out of synchronism, results in effecting more rapid synchronization at the expense of relatively low noise immunity for the system at this time. The relatively low gain condition of the phase detector, when the system is synchronized, results in high electrical inertia contributing a high degree of stability so that the synchronization of the system is not easily disturbed. The manner in which the synchronizing control signal is developed at the junction of the screen electrode 35 and the resistor 43 and the bias potential is developed at the junction of the resistors 43 and 44 will now be considered in detail.

Figure 2:
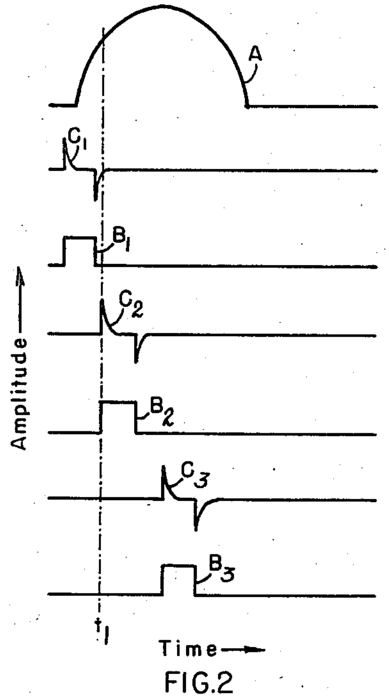
Fig. 2 is a group of curves useful in explaining the operation of the phase detector of Fig. 1.

Preliminary to considering the dynamic operation of the circuit including the tube 26, it will be helpful to discuss the operating characteristics thereof for different operating conditions representing different phasing relations of the flyback and synchronizing pulses. Referring to Fig. 2, the curves thereof represent a line flyback pulse A, line-synchronizing pulses $B_1$, $B_2$, and $B_3$, and positive differentiated line-synchronizing pulses $C_1$, $C_2$, and $C_3$ in a variety of possible static phase relations. As will be better understood hereinafter when considering the details of operation of the phase detector 18, for any set of magnitudes of the circuit elements and static operating potentials for such detector, there is only one stable static phase relationship. However, a wide range of such stable relationships, some of which are represented by Fig. 2, is possible by changing some of such magnitudes. It is helpful, both in order to understand the operation of the detector and in order to select a preferred stable relationship, to consider the currents flowing in the tube 26 over the range of possible static phase relationships. For simplicity and ease of illustration, the pulses of Fig. 2 are not to scale either in duration or magnitude. Preferably, in order to apply adequate operating potentials on the electrodes of the tube 26, the flyback pulses may have magnitudes of the order of 150–300 volts while the synchronizing pulses and differentiated pulses may be of the order of 2–10 volts. In considering the pulses of Fig. 2, it should be remembered that, in order to develop a noise-free control signal, anode current flows in the tube 26 only when a flyback pulse is applied to the anode 33 and the screen electrode 35, a synchronizing pulse is applied to the control electrode 34, and a positive-going differentiated synchronizing pulse is applied to the control electrode 36 with all of these pulses in coincidence. Screen-electrode current flows when only the flyback and synchronizing pulses are applied to the proper electrodes.

Figure 3:
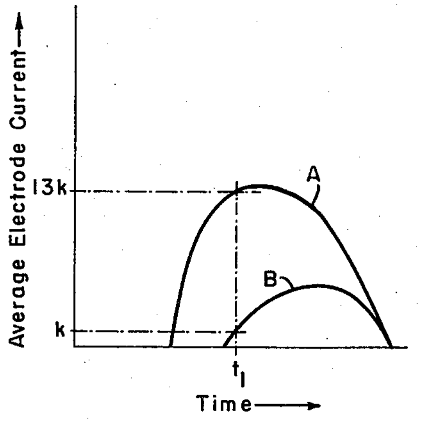
Fig. 3 is a graph of electrode current versus time also useful in explaining the operation of the phase detector of Fig. 1.

If the phasing of the flyback, synchronizing, and positive-going differentiated synchronizing pulses is such as represented by pulses A, $B_1$, and $C_1$, respectively, of Fig. 2, then, since the positive-going differentiated synchronizing pulse $C_1$ is not in coincidence with the flyback pulse A and only a portion of the synchronizing pulse $B_1$ is in coincidence with the flyback pulse A, only a small amount of screen-electrode current flows in the tube 26 and no anode current flows therein. If the phase relations are as represented by the pulses A, $B_2$, and $C_2$ or as represented by the pulses A, $B_3$, and $C_3$, then both anode and screen currents flow in different amounts for the different phase relationships, the amount of current being determined both by the degree of coincidence and the total magnitude of the pulses for each phase relationship. The screen-electrode, anode, and cathode currents for all such possible stable phase conditions, averaged over the intervals between line-synchronizing pulses, are represented by the curves of Fig. 3, curve A representing the average cathode current over the range of possible coincidences of line-frequency and flyback pulses and curve B representing the average anode current over the range of possible coincidences of positive-going differentiated pulses and flyback pulses. As previously mentioned, anode current flows only when the positive-going differentiated synchronizing pulse is in coincidence with the flyback and synchronizing pulses and thus flows over a shorter range than does the cathode current. The difference between the currents represented by curves A and B of Fig. 3, that is, the difference between the average cathode and anode currents is the average screen-electrode current.

The operation of the phase detector including tube 26 is based on the utilization of the average anode and screen currents to maintain the phasing of the flyback and line-synchronizing pulses at some specific phase relation by developing potentials which control the frequency of the signal developed in the oscillator 20. Normally, a control potential of zero is developed when proper phasing of the flyback and synchronizing pulses occurs. If misphasing of these pulses occurs, a control potential of one sense represents a leading of the flyback pulse with respect to the synchronizing pulse and a control potential of opposite sense represents a lagging flyback pulse. The screen-electrode and anode currents flow through the resistors 43 and 44, respectively, and jointly through the cathode resistor 28 to the cathode 32 of the tube 26. The currents flowing in the resistors 43 and 44 develop unidirectional potentials of opposite senses across these resistors and a positive bias potential for the control electrodes 34 and 36 at the junction of the resistors. The curves of Fig. 3 indicate the relative amounts of average anode and screen-electrode currents for different possible stable phase relations of the flyback and synchronizing pulses. One of these phase relations is selected as being the most desirable and the average screen-electrode and anode currents are determined for such relationship. The selected stable phase relationship is preferably one in the vicinity of the mid-point of the positive-going slope of the flyback pulse in order to obtain the most sensitive phase control. For example, one such selected phase relationship is represented at time $t_1$ in Fig. 2 by the pulses A, $B_2$ and $C_2$. The time $t_1$ in Fig. 3 corresponds to the time $t_1$ in Fig. 2 and at this time the average anode current is indicated as having a magnitude $k$ and the average cathode current has a magnitude $13k$ resulting in an average screen-electrode current of $12k$. In other words, at the time $t_1$, when the desired phase relationship represented by pulses A, $B_2$, and $C_2$ exists, the average screen-electrode current is twelve times that of the average anode current for the specific relationship selected. It is apparent that other stable relationships could have been selected resulting in different ratios of the anode and screen-electrode currents.

If zero control potential is to be obtained when the selected stable phase relationship exists, then the potentials developed by the average screen-electrode and anode currents at such time in flowing through the resistors 43 and 44 should be equal and, because of their opposite polarity, develop no control potential at the junction of the resistor 43 and the condenser 45. This result is effected by proportioning the values of the screen-electrode and anode load impedances in inverse ratio of the average currents flowing through the screen electrode and anode for the selected proper phase relationship of the flyback and synchronizing pulses. More specifically, the resistor 44 is made approximately twelve times that of the resistor 43, the resistance of the secondary winding of the transformer 31 being negligible.

With the magnitudes of the resistors 43 and 44 so proportioned, the phase relationship represented by the pulses A, $B_2$, and $C_2$ of Fig. 2 becomes the stable one and all other phase relationships become unstable because each of the latter relationships result in the development of a control potential which adjusts the operation of the oscillator 20 to change the existing phase relationship to the selected stable relationship. If, as represented by the relationship of pulses A, $B_1$, and $C_1$ of Fig. 2, the flyback pulse tends to lag the synchronizing pulse, while some average screen-electrode current flows, relatively little or no average anode current flows. Consequently, a greater potential drop is developed across the screen-electrode load resistor 43 than across the anode load resistor 44 and a net negative control potential is developed at the junction of the resistor 43 and the condenser 45. This control potential, applied through the device 19 to the oscillator 20, is effective to change the phase relationship of the flyback and synchronizing pulses until the stable relationship represented by the pulses A, $B_2$, and $C_2$ is obtained. If, on the other hand, the flyback pulses tend to lead the synchronizing pulses, as represented by the relationship of the pulses A, $B_3$, and $C_3$ of Fig. 2, relatively more average anode current flows resulting in a net positive control potential. Thus, by utilization of the relative magnitudes of the average screen-electrode and anode currents with properly proportioned screen-electrode and anode load resistors, a control potential usable for automatic-phase-control is developed. Since this potential is developed by coincidence of synchronizing pulses, positive differentials of the synchronizing pulses, and flyback pulses, it is not readily disturbed by random noise signals applied to the input circuits of the detector.

In addition to developing an APC control potential, if the gain-control features are utilized, the detector 18 has minimum gain when the flyback and synchronizing pulses are approximately properly phased and maximum gain when they are misphased. In this manner, maximum stability is obtained when the pulses are properly phased and the gain is low, resulting from the minimized effect of noise as well as of the synchronizing pulses. On the other hand, maximum sensitivity and improved pull-in is obtained as a result of the relatively high gain when misphasing occurs. The changes in gain result from the changes in the magnitudes in the bias potentials developed on the cathode 32 and control electrodes 34 and 36 at the times of the two phasing conditions. When the pulses are properly phased, screen-electrode and anode current flows in response to each synchronizing pulse and, therefore, the average current is relatively high. This results in a relatively high bias potential across resistor 28 and condenser 30 which, because of the connection of these elements, is applied between the cathode 32 and the control electrodes 34 and 36 and, hence, serves to reduce the gain of tube 26. As misphasing of the flyback and synchronizing pulses occurs in either sense, screen-electrode and anode currents do not flow in response to each synchronizing pulse since the dynamic operation of the phase-control system causes the flyback and synchronizing pulses cyclically to change in phase with respect to each other until the stable phase relationship is obtained. This continuous movement in phase of the flyback pulse with respect to the synchronizing pulse, in other words, the sliding of the flyback pulse past the synchronizing pulse, results in periods when the synchronizing and flyback pulses do not coincide in time. As a result, the average screen and anode currents decrease when the pulses are misphased resulting in a decrease in the difference of the bias potential between the cathode 32 and control electrodes 34 and 36. The decrease in this bias potential causes an increase in the gain of the tube for the misphasing condition thereby increasing the amplification of the beat-note component with respect to that which would have been present if the gain had not been changed and, consequently, increasing the sensitivity of the phase-detection system and improving the pull-in characteristic.

From the above it should be apparent that the improved phase detector 18 provides a balanced phase detector having a single electron path for developing synchronizing control potentials having a high degree of immunity to noise and varying symmetrically about a reference potential and which may be used in a conventional manner to control the operation of a line-frequency oscillator to effect proper phasing of the line-synchronizing and flyback pulses. In addition, the novel phase detector can be utilized to provide means for controlling the gain of the circuit so that relatively high gain is obtained when the pulses are not properly phased, thereby to effect more rapid phasing, and relatively low gain is obtained when the pulses are properly phased, thereby to provide more stable operation of the oscillator under such condition.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A phase detector for the beam-deflection system of a television receiver comprising: one circuit for supplying beam-deflection synchronizing pulses; another circuit for supplying locally generated deflection signals tending to vary in phase with respect to said synchronizing pulses; an electron-discharge device including a plurality of output electrodes coupled to said other circuit and a plurality of control electrodes one of which is responsive to said synchronizing pulses for controlling the current flowing to one of said output electrodes; means including a signal-shaping circuit coupled between said one supply circuit and another of said control electrodes for modifying the shape of said synchronizing pulses and for applying said modified pulses to said other control electrode for controlling the current flowing to another of said output electrodes; and means including a load circuit coupled to said output electrodes for developing a phase-control potential in accordance with the ratio of average currents flowing therethrough.

2. A phase detector for the beam-deflection system of a television receiver comprising: one circuit for supplying beam-deflection synchronizing pulses; another circuit for supplying locally generated deflection signals tending to vary in phase with respect to said synchronizing pulses; an electron-discharge device having means for developing a stream of current carriers and for directing said stream along a single path and including a plurality of output electrodes coupled to said other circuit and a plurality of control electrodes one of which is responsive to said synchronizing pulses for controlling the current flowing to one of said output electrodes; means including a signal-shaping circuit coupled between said one supply circuit and another of said control electrodes for modifying the shape of said synchronizing pulses and for applying said modified pulses to said other control electrode for controlling the current flowing to another of said output electrodes; and means including a load circuit coupled between said output electrodes and said stream-developing means for developing a phase-control potential in accordance with the ratio of average currents flowing through said output electrodes.

3. A phase detector for the beam-deflection system of a television receiver comprising: one circuit for supplying beam-deflection synchronizing pulses; another circuit for supplying locally generated deflection signals tending to vary in phase with respect to said synchronizing pulses; an electron-discharge device including a cathode, a pair of anodes coupled to said other circuit, and a pair of control electrodes one of which is responsive to said synchronizing pulses for controlling the current flowing from said cathode to one of said anodes; means including a signal-shaping circuit coupled between said one supply circuit and another of said control electrodes for modifying the shape of said synchronizing pulses and for applying said modified pulses to said other control electrode for controlling the current flowing to the other of said anodes; and means including a load circuit for each of said anodes coupled between said anodes and said cathode for developing a phase-control potential in accordance with the ratio of average currents flowing to said anodes.

4. A phase detector for the beam-deflection system of a television receiver comprising: one circuit for supplying beam-deflection synchronizing pulses; another circuit for supplying locally generated deflection signals tending to vary in phase with respect to said synchronizing pulses; an electron-discharge device including a cathode, an anode and screen electrode coupled to said other circuit, and a plurality of control electrodes one of which is responsive to said synchronizing pulses for controlling the current flowing to said screen electrode; means including a signal-shaping circuit coupled between said one supply circuit and another of said control electrodes for modifying the shape of said synchronizing pulses and for applying said modified pulses to said other control electrode for controlling the current flowing to said anode; and means including a load circuit coupled to said anode and screen electrode for developing a phase-control potential in accordance with the ratio of average currents flowing therethrough.

5. A phase detector for the beam-deflection system of a television receiver comprising: one circuit for supplying beam-deflection synchronizing pulses; another circuit for supplying locally generated deflection signals tending to vary in phase with respect to said synchronizing pulses; an electron-discharge device including a plurality of output electrodes coupled to said other circuit and a plurality of control electrodes one of which is responsive to said synchronizing pulses for controlling the current flowing to one of said output electrodes; a signal-differentiating circuit coupled between said one supply circuit and another of said control electrodes for differentiating said synchronizing pulses and for applying the derivative pulses to said other control electrode for controlling the current flowing to another of said output electrodes; and means including a load circuit coupled to said output electrodes for developing a phase-control potential in accordance with the ratio of average currents flowing therethrough.

6. A phase detector for the beam-deflection system of a television receiver comprising: one circuit for supplying beam-deflection synchronizing pulses; another circuit for supplying locally generated deflection signals tending to vary in phase with respect to said synchronizing pulses; an electron-discharge device including a plurality of output electrodes coupled to said other circuit and a plurality of control electrodes one of which is responsive to said synchronizing pulses for controlling the current flowing to one of said output electrodes; a signal-differentiating circuit including a resistor and a condenser coupled between said one control electrode and another of said control electrodes for differentiating said synchronizing pulses applied to said one control electrode to develop derivative pulses for application to said other control electrode for controlling the current flowing to another of said output electrodes; and means including a load circuit coupled to said output electrodes for developing a phase-control potential in accordance with the ratio of average currents flowing therethrough.

7. A phase detector for the beam-deflection system of a television receiver comprising: one circuit for supplying beam-deflection synchronizing pulses; another circuit for supplying locally generated deflection signals tending to vary in phase with respect to said synchronizing pulses; an electron-discharge device including a cathode, an anode and screen electrode coupled to said other circuit, and a pair of control electrodes one of which is responsive to said synchronizing pulses for controlling the current flowing to said screen electrode; means including a signal-shaping circuit coupled between said one supply circuit and another of said control electrodes for modifying the shape of said synchronizing pulses and for applying said modified pulses to said other control electrode for controlling the current flowing to said anode; and a load circuit including a pair of resistor circuits individually coupled between said anode and screen electrode and a common point coupled to said cathode, with the resistances of said pair of circuits being inversely proportional to the average anode and screen-electrode currents flowing when said beam-deflection system is synchronized, for developing at said screen electrode a phase-control potential in accordance with the ratio of average currents flowing through said anode and screen electrode.

8. In a television receiver, a phase detector comprising: a source of received synchronizing pulses; a source of locally generated flyback pulses; a multigrid electron-discharge device including a cathode, three intermediate control electrodes and an anode, the anode and a first control electrode being coupled to the source of flyback pulses and a second of the control electrodes being coupled to the source of received synchronizing pulses for controlling current flow to the first control electrode; a signal-shaping circuit coupled between the source of received synchronizing pulses and the third of the control electrodes for controlling anode-current flow in accordance with a modified form of the received synchronizing pulses; a first load impedance coupled between the anode and the cathode and a second load impedance coupled between the first control electrode and the cathode; and an output terminal coupled to both load impedances for deriving a phase-indicative control signal determined by the ratio of anode and first control electrode current flows.

References Cited in the file of this patent

UNITED STATES PATENTS

| | | |
|---|---|---|
| 2,211,942 | White | Aug. 20, 1940 |
| 2,473,853 | Boykin | June 21, 1949 |
| 2,539,374 | Pourciau et al. | Jan. 23, 1951 |
| 2,561,182 | Crane, Jr. | July 17, 1951 |
| 2,640,103 | Clements | May 26, 1953 |
| 2,644,133 | Soukaras | June 30, 1953 |
| 2,645,717 | Massman | July 14, 1953 |
| 2,810,783 | Gruen | Oct. 22, 1957 |